No. 760,984. Patented May 24, 1904.

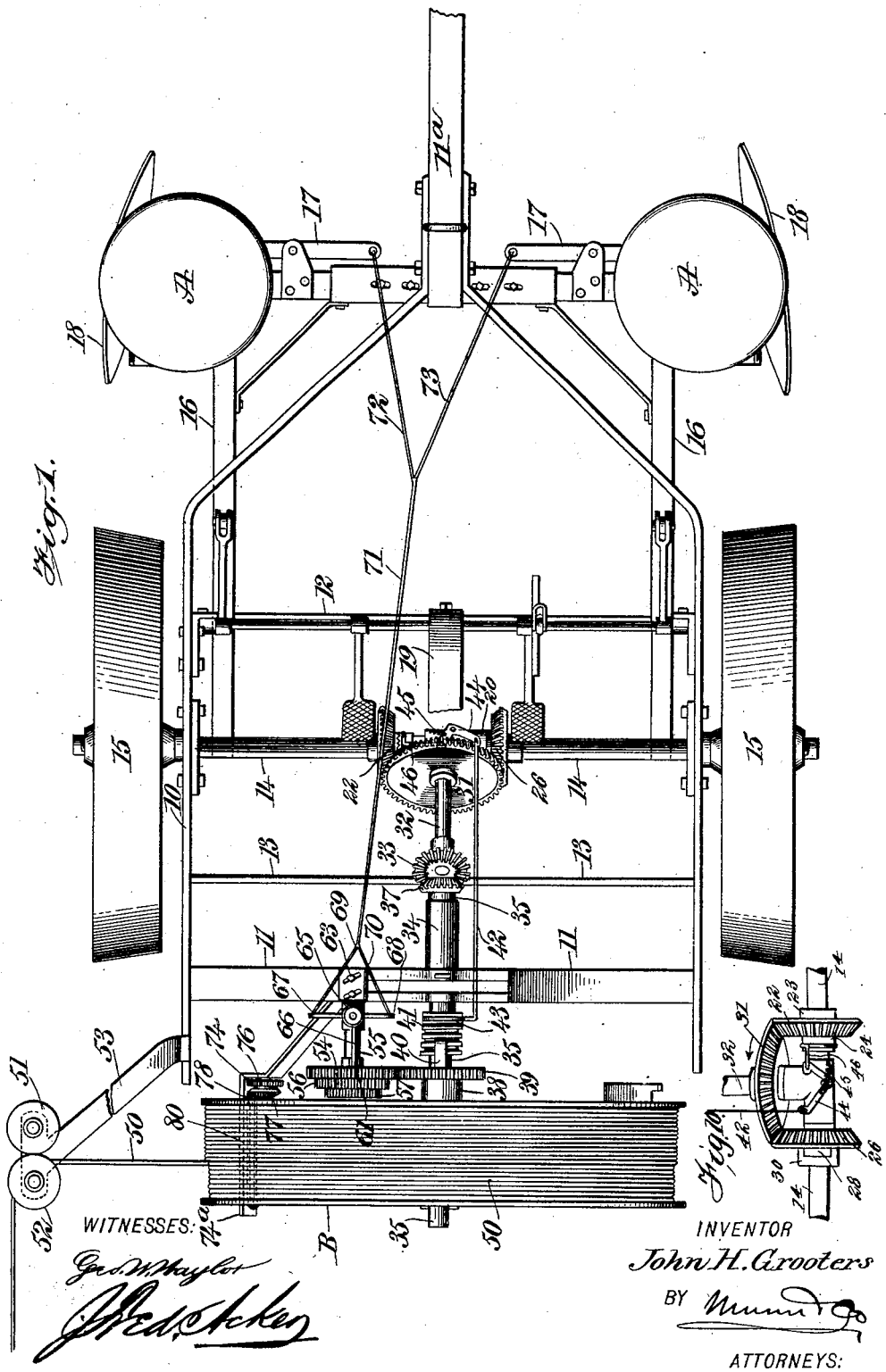

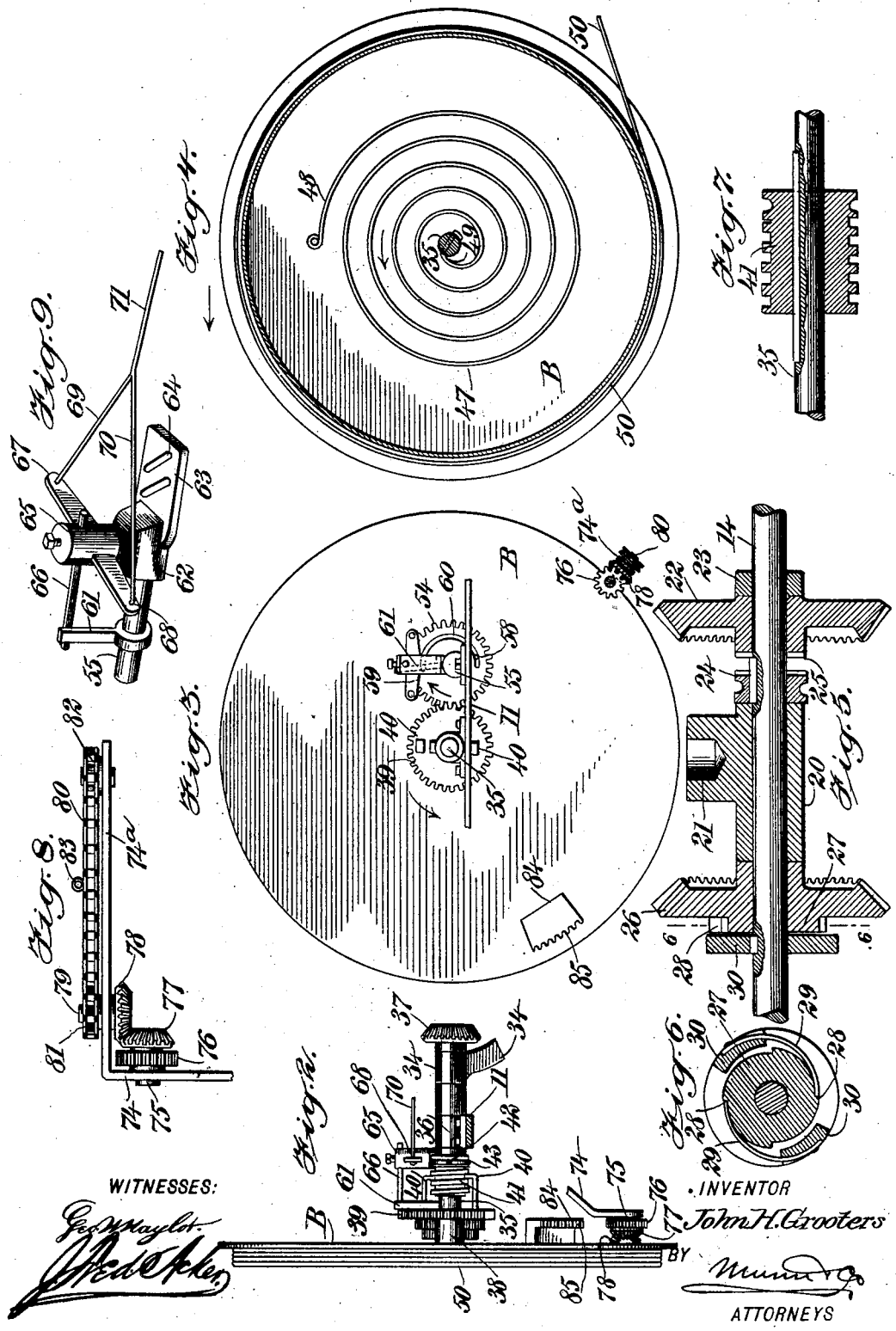

UNITED STATES PATENT OFFICE.

JOHN H. GROOTERS, OF ALLENDORF, IOWA.

REEL FOR PLANTERS.

SPECIFICATION forming part of Letters Patent No. 760,984, dated May 24, 1904.

Original application filed April 28, 1903, Serial No. 154,617. Divided and this application filed August 22, 1903. Serial No. 170,446. (No model.)

*To all whom it may concern:*

Be it known that I, JOHN H. GROOTERS, a citizen of the United States, and a resident of Allendorf, in the county of Osceola and State of Iowa, have invented a new and Improved Reel for Planters, of which the following is a full, clear, and exact description, this being a division of the application for an improvement in planters, filed by me April 28, 1903, Serial No. 154,617.

My invention relates to an attachment to planters of that type which is provided with a guide wire, chain, or cable, one end of the wire, chain, or cable being adapted for attachment to a stake fastened to the ground at one end of a proposed row, the other end of the wire, chain, or cable being adapted for attachment to a reel mounted to rotate at the rear of the machine.

The purpose of the invention is to provide a spring-controlled reel or drum mounted to rotate and a driving connection between the rotary support for the drum or reel and the main drive-shaft or axle of the machine, whereby the drum or reel will be turned in direction to relieve it from the tension of the controlling-spring to permit the wire, chain, or cable to readily unwind from the drum or reel when the machine is traveling away from the anchoring-stake and also to provide means for automatically placing the controlling-spring of the drum or reel under tension at a predetermined time by turning the connecting drive-shaft for the drum or reel in an opposite direction, thereby causing the slack guide wire, chain, or cable to be rewound upon the drum or reel when the machine is reversed to approach the stake.

A further purpose of the invention is to provide means, controlled by the movement of the reel or drum, for releasing the seed at proper periods from the seedboxes employed.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of a planter and the improved reel or drum applied. Fig. 2 is an edge view of a portion of the reel or drum, its supporting-shaft, and connected gearing, and also a side elevation of a portion of the guide device employed for the wire while being wound upon the reel or drum. Fig. 3 is a front elevation of the reel or drum. Fig. 4 is a vertical section through the reel or drum and a transverse section through its shaft-support. Fig. 5 is a detail longitudinal sectional view of the driving-gearing and clutch carried by the main shaft or axle of the machine. Fig. 6 is a transverse section taken practically on the line 6 6 of Fig. 5. Fig. 7 is a detail sectional view of the controlling device for the reel. Fig. 8 is a detail view of the device employed to guide the wire when being wound up upon the reel or drum. Fig. 9 is a perspective view of the trip mechanism for the seed-dropping device employed and which is acted upon by the gearing shown in connection with the reel or drum, (see Fig. 3,) and Fig. 10 is a detail view of a portion of the shifting device.

The planter illustrated consists of a rear or main frame-section comprising side beams 10, connected at the rear by an upwardly-arched beam 11, and intermediate of its ends by a flat cross-beam 12. The forward end portions of the side beams 10 are shown brought together and as secured to the tongue or pole 11$^a$. The side pieces 10 of the frame are shown further connected by an intermediate arched bar 13 of less height than the rear arched bar or beam 11, and the bar or beam 13 is in front of the said bar or beam 11, as is shown in Fig. 1. The main axle 14, which is likewise a drive-shaft, is journaled in suitable bearings in the side pieces 10 of the main frame, and the supporting-wheels 15 are secured to the ends of this axle or drive-shaft 14.

In addition to the main frame 10 a forward auxiliary frame 16 is employed, comprising side and front members, the side members of the front or auxiliary frame 16 being suitably hinged or pivoted to the bearings for the axle or drive-shaft 14, although the said forward frame 16 may be pivotally attached to the rear or main frame in any desired manner, the forward frame being given a downward movement.

The seedboxes A are represented as two in number and as located at the forward side portions of the forward frame 16. These seedboxes are shown provided with trip-bars 17 for their seed-drop slides, the trip-bars being pivotally attached to the forward member of the auxiliary frame 16. Furthermore, in the construction of the planter furrow-openers 18 are shown as carried by the forward frame 16, one adjacent to the outer side of each seedbox A. 19, in Fig. 1, represents the standard adapted to support the driver's seat.

A sleeve 20 is located at the central portion of the axle or main drive-shaft 14, (shown in detail in Fig. 5,) and a bearing 21 is formed in the upper portion of this sleeve. At the left-hand side of the sleeve 20 and removed a predetermined distance therefrom a bevel-gear 22 is mounted on the said shaft or axle 14, and in engagement with the outer face of this gear a collar 23 is secured to the said shaft or axle 14. The teeth of the gear-wheel 22 face in direction of the right-hand end of the shaft or axle, and between the left-hand end of the bearing 20 and the left-hand bevel-gear 22 a clutch 24 is mounted to slide and turn with the said shaft or axle 14, adapted for engagement with a clutch-surface 25 on the inner hub of the aforesaid bevel-gear, as is also shown in Fig. 5. In the same figure it will be observed that at the right-hand end of the said sleeve 21 a second bevel-gear 26 is loosely mounted, being of the same size as the opposing gear 22. The teeth of the bevel-gear 26 also face inward.

The outer hub 27 of the right-hand bevel-gear 26 is provided with ratchet-teeth 28, as is shown in Figs. 5 and 6, and these ratchet-teeth are engaged by spring-dogs 29, secured to a collar or disk 30, which is attached in any suitable or approved manner to the shaft or axle 14 and turns therewith. The left-hand bevel-gear 22 is not brought into action until it is engaged by the clutch-collar 24, and at such time the right-hand bevel-gear 26 is idle, as the dogs 29 will simply slip over the ratchet-teeth of the hub-gear; but when the gear 22 is out of engagement with the clutch 24 the gear 26 will be turned by the shaft or axle 14 through the medium of the said disk or collar 30 and its dogs. This is accomplished by causing the two bevel-gears 22 and 26 to be constantly in mesh with a bevel-gear 31, as is shown in Fig. 1, the bevel-gear 31 being practically horizontally placed above the said gears 22 and 26. This upper connecting bevel-gear 31 is secured on a shaft 32, the lower end of which shaft is journaled in the bearings 21, carried by the sleeve 20. (Shown in Fig. 5.) The shaft 32 has an upward and a rearward inclination and is provided at its upper end with a bevel-pinion 33.

The upper portion of the shaft 32 is journaled in a bifurcated bearing 34, adapted to be carried by the intermediate arched bar 13, a portion of which bearing 34 is shown in Fig. 2, and a horizontal shaft 35 is likewise journaled in the bearing 34 and in an intermediate bearing 36, carried by the arched beam or bar 11. At the forward end of the shaft 35 a bevel-pinion 37 is secured, meshing with the pinion 33 on the shaft 32, as is illustrated in Fig. 1. It will be observed that the two shafts 32 and 35 will be turned in one direction when the bevel-gear 22 on the axle or main shaft 14 is engaged by the clutch 24, and the said shafts will be turned in a reverse direction when the bevel-gear 22 is disconnected from the clutch 24. The opposing bevel-gear 26 then turns with the said drive or main shaft 14 in the manner which has been described.

A reel or drum B is mounted to loosely turn on the rear end of the horizontal shaft 35. At the front central portion of the drum or reel B a hub 38 is secured, and the said hub carries at its outer or forward end a gear-wheel 39, the shaft 35 passing loosely through this gear-wheel and the hub 38. The gear-wheel 39 is provided with upper and lower fingers 40, which are made to travel in engagement with the thread of a worm 41, which worm is in front of the gear-wheel 39 and is mounted to turn with the shaft 35, yet has limited sliding movement thereon, as is shown in Fig. 7. A shifting-rod 42 is connected with the worm 41 by means of a ring 43, which is loosely fitted in the annular groove at the forward end of the worm. This shifting rod 42 extends downward to the front central portion of the axle or shaft 14 and is connected with one end of a bell-crank lever 44, fulcrumed at the junction of its members upon the lower portion of the sleeve 20, through which the central portion of the axle or shaft 14 passes. A spring 45 (shown in Fig. 1) is attached to this lever at one side of its pivot-point and to the sleeve 20 at the opposite side of the said pivot-point of the lever. A shifting fork 46 (also shown in Figs. 1 and 10) is attached to the other member of the bell-crank lever 44 and to the clutch 24. Sufficient play is provided where the shifting rod 42 and the shifting fork 46 connect with the bell-crank lever 44 to permit the spring 45 to act quickly to throw either limb of the bell-crank lever in the desired direction.

A coil or helical spring 47 is located within the drum or reel B, as is shown in Fig. 4. This spring at its outer end 48 is attached to the drum or reel in any suitable or approved manner, and the inner end 49 of the spring is secured to the shaft 35, around which the spring is coiled. The drum or reel B is adapted to have a guide wire, chain, rope, or cable 50 wound upon or unwound from its periphery, and this wire, since a wire is preferably used, when passing to or from the drum is made to pass between guide-rollers 51 and 52, horizontally supported upon an arm 53, which is detachably connected to the rear end of a side member of the main frame 10, so that the arm or support 53 for these guide-rollers may be transferred from one side of the machine to the other, as occasion may demand.

In the operation of the winding and unwinding mechanism for the wire, chain, rope, or cable 50 when the machine starts the outer or free end of the wire, for example, is attached to a stake planted firmly in the ground at the starting end of the row. As the machine travels away from the stake the drum or reel is turned by the action of the wire unreeling from the drum, and the shaft 35, supporting the drum, is turned in the same direction, but at greater speed than the speed of the drum or reel, which relative operation of the two parts is indicated by the arrows in Fig. 4. The intermediate driving-shaft 35 is in clutch connection with the left-hand bevel-gear 22. The tendency of the drum or reel in such rotation will be to wind up the spring 47, while the tendency of the shaft 35 in its rotation at such time will be to keep the spring unwound to such an extent that a uniform tension will be maintained for the spring, since as the spring could be safely placed under a tension of nine pounds, for example, in order to preserve the spring against undue strain it is desirable that the tension thereon in operation in such case be not more than six pounds. Therefore when the drum or reel commences to race, and thus tends to unduly wind up the spring 47, the arms 40 from the gear 39, carried by the drum, will travel upon the worm 41 to such an extent as to force the worm 41 rearward upon its shaft and cause the shifting rod 42 to operate to carry the clutch 24 out of engagement with the left-hand gear 22, bringing the right-hand driving-gear 26 into action, whereupon the direction of rotation of the shaft 35 will be reversed until the spring 47 has been restored to its normal function, and when such a point is reached the arms 40 referred to will have so acted on the worm 41 as to restore it to its normal position under such travel of the machine, and the clutch 24 will then be again made to engage with the left-hand gear 22, and such interchange between the driving-gears 22 and 26 is maintained during the travel of the machine from the stake whenever such interchange is necessary to equalize the tension of the spring 47.

When the machine is reversed to travel in direction of the said stake, an ordinary shifting lever is manually operated by any suitably-applied hand or foot lever within convenient reach the driver's seat to bring the right-hand gear 26 into action and to reverse the direction of travel of the drum or reel B from the direction of travel shown by the arrows in Fig. 4, whereupon the spring 47 is so placed under tension as to cause the drum or reel B to be turned by the shaft 35 in a direction to effect a rewinding of the wire 50 on the drum or reel as the stake is approached; but should the tension of the spring 47 at such time be increased to a comparatively dangerous extent the action of the worm 41 and the arms 40 from the gear 39, carried by the drum or reel, will be the same as has been described—namely the shaft 35 will be under the control of either the driving-gear 26 or the driving-gear 22, thereby maintaining the tension of the spring 47 within the limit of a predetermined number of pounds.

The mechanism adapted to establish communication between the reel or drum B and any form of seed-dropping mechanism employed on the planter is constructed and arranged as follows: A gear 54 of the same diameter as the gear 39, carried by the drum or reel B, is in mesh with the said gear 39, as is shown in Figs. 1 and 3. This gear 54 is loosely mounted upon a rearwardly-extending shaft 55, and said gear 54 is provided with two or more gears of less diameter secured thereto at its back, as is particularly shown in Fig. 1, either of which gears may be brought into mesh with the gear 39, carried by the drum or reel, so as to increase or decrease the speed of the seed-dropping devices. These reduced gears are designated as 56 and 57. The larger gear 54 is provided with two pins 58 and 59, located practically opposite each other near the periphery of the said gear, the pins extending from the forward face of the gear 54. The pin 59 is shown as a fixed pin, while the pin 58 is shown adjustable in the segmental slot 60, produced in the said gear 54; but I desire it to be understood that both these pins 58 and 59 may be rendered adjustable, if desired. As stated, the connected gears 54, 56, and 57 are loosely mounted on the shaft 55, and the pins 58 and 59 are adapted to move an actuating-arm 61, which is loosely mounted on the shaft 55 at the front of the larger gear 54, as is shown in Figs. 3 and 9. One of the pins—59, for example—operates the actuating-arms 61 during the passage of the machine from the stake, and the other pin, 58, will operate the actuating-arm 61 during the passage of the machine toward the stake, or vice versa. The shaft 55 just referred to is secured in a suitable bearing 62, and this bearing is attached to or made integral with a horizontal plate 63, having one or more diagonal slots 64 produced therein, as is shown in Fig. 9. The plate 63 is attached, preferably, to the rear arched beam 11 at its top or to any other convenient support by means of adjusting screws or bolts passed through the diagonal slots 64, so that by loosening the said screws or bolts the plate 63 may be adjusted forward or rearward, as may be required, to bring either one of the gears 54, 56, and 57 in mesh with the gear 39, operated by the action of the drum or reel B.

A sleeve 65 is mounted to turn upon a suitable stud carried upward from the bearing 62, as is shown in Fig. 9, and a trip-pin 66 is horizontally secured to this sleeve 65, which trip-pin is adapted to be engaged by the actuating-arm 61 as the said arm is made to move by the rotation of the combined gears 54, 56, and 57. When the said actuating-arm 61 operates upon the horizontal pin 66, it imparts a rocking motion to the sleeve 61, and this sleeve 61 has horizontal arms 67 and 68, which are made to extend from opposite sides of the sleeve, as is also shown in Fig. 9. Wires, ropes, chains, or cables 69 and 70 are respectively attached to the arms 67 and 68. These two ropes, chains, cables, or wires are combinedly attached to a single wire, rope, chain, or cable 71, which is carried in direction of the forward end of the machine and is there connected with oppositely-disposed branch wires, ropes, chains, or cables 72 and 73, as shown in Fig. 1. These forward branch wires, ropes, chains, or cables 72 and 73 are adapted to act upon the regulating devices for the seed-dropping mechanism of the seedboxes A, being connected with the operating-levers 17 of the said seedboxes.

It is very desirable that some device should be employed for regulating the wire 50 while being wound upon the drum B and to impart more or less of a traverse motion to the said wire during the rewinding process. Such a device is illustrated in detail in Fig. 8 and is shown applied particularly in Figs. 1, 2, and 3. This device consists of a bracket-arm 74, attached at its upper end, for example, to the rear arched beam 11 of the main frame of the machine. This bracket-arm 74 extends downward and rearward and more or less outward, being provided at its lower end with a straight section (shown best in Fig. 1) and with a branch member 74ª, which extends at the lower portion of one side of the drum or reel B out of engagement with the same.

At the straight lower portion of the bracket-arm 74 a spindle 75 is mounted to turn, and, as is particularly shown in Fig. 8, this spindle carries a pinion 76 and a beveled pinion 77, both of which are secured to the said spindle and turn therewith. The bevel-pinion 77 meshes with a corresponding pinion 78, which is mounted on a spindle 79, extending through the branch member 74ª of the bracket-arm 74, and at the rear end of this spindle 79 a suitable sprocket-wheel 81 is secured, over which an endless chain 80 is passed, said chain being likewise passed over an idler sprocket-wheel 82 at the opposite end of the branch member 74ª of the said bracket-arm 74. The endless chain 80 is provided with an eye 83, through which the wire 50 passes before it reaches the drum or reel B.

The mechanism just described and shown particularly in Fig. 8 is brought periodically into action by forming an offset 84 on the front face of the drum or reel B, as is shown best in Fig. 2, which offset is provided with a segmental outer edge, and in said outer edge of the offset teeth 85 are produced. As the drum revolves the teeth of the offset 84 are brought in engagement with the pinion 76, turning the same, and thus imparting a limited movement to the endless chain 80, thereby guiding the wire 50 on the drum or reel B to such an extent that one strand wound on the drum or reel will not unduly crowd or overlap an adjacent strand in the same row or series.

Having thus described my invention, I claim as new and desire to secure by Letters Patent—

1. In reels for planters, a drum adapted to carry a guide-wire and to unreel the wire therefrom and rereel it thereon, a shaft on which the drum is loosely mounted, a spring coiled around the shaft, having one end attached to the shaft and its other end secured to the drum, driving-gearing for the drum, and guide devices for the material to be wound upon and unwound from the drum, as set forth.

2. In reels for planters, a drum adapted to carry a guide-wire and to unreel the wire therefrom and rereel it thereon, a shaft on which the drum is loosely mounted, a spring coiled around the shaft, having one end attached to the shaft and its other end secured to the drum, and driving-gearing for the shaft, including means for reversing the direction of rotation of the shaft.

3. In reels for planters, a drum adapted to carry a guide-wire and unreel the wire therefrom and rereel it thereon, a shaft upon which the drum is loosely mounted, a spring having one end attached to the shaft and its other end secured to the drum, driving-gearing for the shaft, including means for automatically reversing and controlling the direction of rotation of the shaft, and connections for automatically operating such means by the rotation of the drum, as set forth.

4. In a reel for planters, a drum adapted to carry guide-wire and to unreel the wire therefrom and rereel it thereon, a shaft on which the drum is loosely mounted, a spring coiled around the shaft, having one end attached to the shaft and the other end secured to the drum, and a driving-gear for the shaft, including means for reversing and controlling the direction of rotation of the shaft, and connections for automatically operating such means by the rotation of the drum under predetermined conditions in the rotation of the drum, as described.

5. In reels for planters, a drum adapted to carry guide-wire and to unreel the wire therefrom and rereel it thereon, a shaft upon which the drum is loosely mounted, a spring coiled around the shaft, attached at one end thereto and secured at its opposite end to the drum, reversible driving-gearing for the shaft, and means controlled by the drum for automatically operating the driving-gear to turn the shaft in one or the other direction, which means are automatically brought into action the moment the spring attains a tension beyond a predetermined degree, to obtain a uniform tension of the spring under substantially all conditions of use.

6. In a planter, the combination with a wheel-supported frame the axle whereof is provided with a sleeve-bearing, opposing beveled gears at each end of the said sleeve, bearings loosely mounted on the said axle, a clutch adapted to operate to and from one of the gears on the axle, the other gear being provided with a ratchet-face, and a collar secured to the axle, having spring-dogs for engagement with the said ratchet-face, of a shaft mounted in the bearings of the said sleeve, a beveled gear operating in engagement with both bevel-gears on the axle, a second shaft in gear connection with the first-named shaft, the second shaft being a horizontal shaft, supports for both of the shafts, a drum loosely mounted on the horizontal shaft, a spring coiled around the horizontal shaft, secured to the said shaft and to the drum, an extension from the drum, a worm having sliding movement on the horizontal shaft, being engaged with the said extension from the drum and adapted to turn with the horizontal shaft, and a shifting connection between the said worm and the clutch on the axle, as described.

7. In a reel for planters, the combination with a wheel-supported frame the axle whereof is provided with a sleeve-bearing, opposing beveled gears at each end of the said sleeve-bearing loosely mounted on the said axle, a clutch adapted to operate to and from one of the gears of the axle, the other gear being provided with a ratchet-face, and a collar secured to the axle, having spring-dogs for engagement with the said ratchet-face; of a shaft mounted in the bearings of the sleeve, a bevel-gear operating in engagement with both of the bevel-gears of the axle, a second shaft in gear connection with the first-named shaft, the second shaft being a horizontal shaft, supports for both shafts, a drum loosely mounted on the horizontal shaft, a spring coiled around the horizontal shaft, secured to the said shaft and to the drum, an extension from the drum, a worm having sliding movement on the horizontal shaft, being engaged with the said extension from the drum and adapted to turn with the horizontal shaft, a shifting rod connected with the worm, a spring-controlled bell-crank lever mounted on the sleeve-bearing carried by the axle, a connection between one limb of the said lever and the said shifting rod, and a connection between the opposite limb of the lever and the said clutch on the axle.

8. In reels for planters, the combination with a wheel-supported frame, a shaft carried by the frame, and means for operating the shaft, of a drum loosely mounted on the shaft, a spring coiled around the shaft, being attached thereto and to the drum, and roller-guides carried by the drum, through which the material to be wound on the drum is passed to and from the drum, as specified.

9. In a reel for planters, the combination with a drum mounted to revolve, a support for the drum, a frame carrying said support, and a bracket extending from the frame and across a portion of the periphery of the drum, of an endless chain carried by that portion of the bracket extending across the drum, the said chain being provided with an eye through which the material to be wound on the drum is passed to the drum, a chain of gearing for driving the endless chain, and a toothed projection carried by the drum, adapted in the rotation of the drum to operate the said chain of gearing, causing the material to wind on the drum with a traverse motion.

10. In reels for planters, the combination with a seed-dropping mechanism of a planter, of a drum adapted to carry a guide-wire and to unreel the wire therefrom and rereel it thereon, a shaft on which the drum is loosely mounted, a spring coiled around the shaft, having one end attached to the shaft and its other end secured to the drum, driving-gearing for the shaft, including means for reversing the direction of rotation of the shaft, and mechanism operated by the rotation of the drum, for controlling the action of the said seed-dropping mechanism, as set forth.

In testimony whereof I have signed my name to this specification in the presence of two subscribing witnesses.

JOHN H. GROOTERS.

Witnesses:
J. FRED. MATTERT,
W. EMMERT.